(12) United States Patent
Nakao et al.

(10) Patent No.: US 9,499,654 B2
(45) Date of Patent: Nov. 22, 2016

(54) AQUEOUS URETHANE RESIN COMPOSITION

(71) Applicant: Bayer Intellectual Property GmbH, Monheim am Rhein (DE)

(72) Inventors: Makoto Nakao, Nishinomiya (JP); Hiroshi Morita, Shijonawate (JP)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/367,009

(22) PCT Filed: Dec. 20, 2012

(86) PCT No.: PCT/EP2012/076375
§ 371 (c)(1),
(2) Date: Jun. 19, 2014

(87) PCT Pub. No.: WO2013/098186
PCT Pub. Date: Jul. 4, 2013

(65) Prior Publication Data
US 2014/0378611 A1 Dec. 25, 2014

(30) Foreign Application Priority Data

Dec. 27, 2011 (JP) ................................. 2011-286280
Oct. 12, 2012 (JP) ................................. 2012-226815

(51) Int. Cl.
*C08G 18/38* (2006.01)
*C08G 18/62* (2006.01)
(Continued)

(52) U.S. Cl.
CPC ....... *C08G 18/3821* (2013.01); *C08G 18/6245* (2013.01); *C08G 18/6254* (2013.01);
(Continued)

(58) Field of Classification Search
CPC ........................... C09D 175/12; C09D 175/04
See application file for complete search history.

(56) References Cited

U.S. PATENT DOCUMENTS 5,075,370 A * 12/1991 Kubitza et al. ............... 524/591
5,126,170 A * 6/1992 Zwiener et al. ........... 427/385.5
(Continued)

FOREIGN PATENT DOCUMENTS

| EP | 1054046 A2 | 11/2000 |
|----|------------|---------|
| JP | H0832851 B2 | 4/1990 |
| JP | 2004131601 A | 4/2004 |

OTHER PUBLICATIONS

'Hexamethylene diisocyanate'. Obtained from https://en.wikipedia.org/wiki/Hexamethylene_diisocyanate on Aug. 22, 2015. No author, no date.*

(Continued)

*Primary Examiner* — Michael A Salvitti
(74) *Attorney, Agent, or Firm* — Drinker Biddle & Reath LLP

(57) ABSTRACT

To provide an aqueous urethane resin composition with high reactivity, excellent drying characteristics, and the like, even under low-temperature environment.
Provided is an aqueous urethane resin composition consisting mainly of the following (A) component and containing the following (B) and (C) components:
(A) Hydrophilic polyol,
(B) Water dispersible polyisocyanate,
(C) Aspartic acid ester having a secondary amino group

6 Claims, 1 Drawing Sheet

CLAIM [C. 1] DESCRIPTION [C. 1] [C. 2]

...... (1)

[In the formula (1), m is an integer of 2 or more, and X is an m-valent organic group inactive to an isocyanate group at a temperature of 100°C or less. $R^1$ and $R^2$ are organic groups inactive to isocyanate, they may be the same or different from each other.]

(51) Int. Cl.
- *C08G 18/65* (2006.01)
- *C08G 18/70* (2006.01)
- *C08G 18/79* (2006.01)
- *C09D 175/12* (2006.01)
- *C08G 18/73* (2006.01)
- *C08K 3/20* (2006.01)

(52) U.S. Cl.
CPC ......... *C08G 18/6529* (2013.01); *C08G 18/706* (2013.01); *C08G 18/73* (2013.01); *C08G 18/792* (2013.01); *C08K 3/20* (2013.01); *C09D 175/12* (2013.01)

(56) References Cited

U.S. PATENT DOCUMENTS

| | | | |
|---|---|---|---|
| 5,236,741 A * | 8/1993 | Zwiener et al. | 427/385.5 |
| 5,243,012 A * | 9/1993 | Wicks | C08G 18/3821 528/58 |
| 5,364,955 A * | 11/1994 | Zwiener | C07F 7/182 556/418 |
| 5,389,718 A * | 2/1995 | Potter et al. | 524/591 |
| 5,733,967 A * | 3/1998 | Wicks | C08G 18/0804 524/539 |
| 5,736,604 A * | 4/1998 | Luthra | 524/591 |
| 5,919,860 A * | 7/1999 | Roesler et al. | 524/838 |
| 5,932,652 A * | 8/1999 | Roesler et al. | 524/839 |
| 5,945,476 A * | 8/1999 | Roesler et al. | 524/588 |
| 6,057,415 A * | 5/2000 | Roesler et al. | 528/28 |
| 6,063,863 A * | 5/2000 | Yu et al. | 524/838 |
| 6,077,901 A * | 6/2000 | Roesler et al. | 524/588 |
| 6,316,535 B1 * | 11/2001 | Caldwell et al. | 524/425 |
| 6,355,829 B2 * | 3/2002 | Roesler et al. | 560/25 |
| 6,444,325 B1 * | 9/2002 | Roesler et al. | 428/447 |
| 6,706,801 B1 * | 3/2004 | Blum et al. | 524/507 |
| 2005/0137324 A1* | 6/2005 | Roesler et al. | 524/589 |
| 2005/0137374 A1* | 6/2005 | Roesler et al. | 528/44 |
| 2005/0271881 A1* | 12/2005 | Hong | 428/423.1 |
| 2006/0014922 A1* | 1/2006 | Kohler | C07C 229/24 528/328 |
| 2011/0070387 A1* | 3/2011 | Schmidt et al. | 428/36.91 |
| 2014/0378611 A1* | 12/2014 | Nakao et al. | 524/839 |

OTHER PUBLICATIONS

VencoreX Isophorone Diisocyanate (IPDI) Product data sheet. No Author, No Date. Obtained from http://www.vencorex.com/wp-content/uploads/2012/10/PDS-IPDI-July-2012-v8-EN.pdf on May 26, 2016.*
International Search Report for PCT/EP2012/076375 mailed Feb. 22, 2013.

* cited by examiner

CLAIM [C. 1] DESCRIPTION [C. 1] [C. 2]
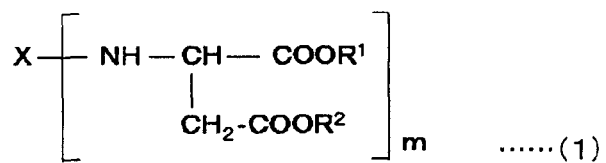
[In the formula (1), m is an integer of 2 or more, and X is an m-valent organic group inactive to an isocyanate group at a temperature of 100°C or less. $R^1$ and $R^2$ are organic groups inactive to isocyanate, they may be the same or different from each other.]

AQUEOUS URETHANE RESIN COMPOSITION

CROSS-REFERENCE TO RELATED APPLICATIONS

This application is a national stage application (under 35 U.S.C. §371) of PCT/EP2012/076375, filed Dec. 20, 2012, which claims benefit of Japanese Application No. 2011-286280, filed Dec. 27, 2011, both of which are incorporated herein by reference in their entirety.

TECHNICAL FIELD

The present invention relates to an aqueous urethane resin corn position. Specifically, it relates to an aqueous urethane resin composition which is mainly used as a two component resin composition and adaptable to applications such as paint, adhesive and sealant.

BACKGROUND ART

In fields such as paint, adhesive and sealant, there has been a requirement on reduction of VOC (volatile organic compound), in consideration of the environment. Under such situation, for example, as an aqueous resin composition prepared without using an organic solvent, there is being developed an aqueous urethane resin composition where hydrophilic polyol is used as a base resin and hydrophilic polyisocyanate or low-viscosity polyisocyanate is used as a hardener (for instance, see Patent documents 1, 2).

PRIOR ART DOCUMENT

Patent Document

[Patent document 1] Japanese Examined Patent Publication No. Hei 8-32851 (1996)
[Patent document 2] Japanese Unexamined Patent Publication No. 2004-131601

SUMMARY OF THE INVENTION

Problem to be Solved by the Invention

However, the aqueous urethane resin composition disclosed in the above-described Patent document has a problem that reactivity and drying characteristics are low in the actual usage. In the case of assuming an operation in a low-temperature environment particularly in winter, the lowering of its reactivity and drying characteristics is remarkable, so improvements are desired.

Since the conventional aqueous urethane resin composition is inferior in reactivity and drying characteristics, there is also a problem that film-forming is difficult when applied thickly for example.

In the light of these facts, the present invention was made, aiming at providing an aqueous urethane resin composition with high reactivity, excellent drying characteristics, and the like, even under low-temperature environment.

Means to Solve the Problems

In order to achieve the above-described purpose, an aqueous urethane resin composition of the present invention has a constitution consisting mainly of the following (A) component and containing the following (B) and (C) components:
(A) Hydrophilic polyol,
(B) Water dispersible polyisocyanate,
(C) Aspartic acid ester having a secondary amino group.

Namely, the present inventors keenly studied for obtaining an aqueous urethane resin composition with high reactivity, excellent drying characteristics, and the like, even under low-temperature environment. In the course of the studies, the present inventors hit on the idea of compounding aspartic acid ester having a secondary amino group (C) in an urethane resin composition consisting mainly of hydrophilic polyol (A) and containing water dispersible polyisocyanate (B) as a hardener. Since aspartic acid ester is low in water dispersibility, there has conventionally been no study of compounding it in an aqueous resin composition, but the present inventors found that dispersion stability was able to be improved when used concomitantly with hydrophilic polyol, and succeeded in breaking down the conventional technical common knowledge. Since aspartic acid ester having a secondary amino group is a hydrogen compound with a high activity, it easily reacts with isocyanate. As a result, the present inventors found out the followings and achieved the present invention: while a resin composition consisting mainly of the above-described hydrophilic polyol (A) and containing water dispersible polyisocyanate (B) and aspartic acid ester having a secondary amino group (C) remains aqueous, its reactivity can be improved, further drying characteristics (in particular, drying characteristics under low-temperature environment) become good, thereby making it possible to easily form the coating into a thick film.

Effect of the Invention

As described above, the aqueous urethane resin composition of the present invention consists mainly of hydrophilic polyol (A) and contains water dispersible polyisocyanate (B) and aspartic acid ester having a secondary amino group (C). Therefore, since the aqueous urethane resin composition of the present invention is high in reactivity and excellent in drying characteristics even under low-temperature environment, it is possible to easily form the coating into a thick film. The aqueous urethane resin composition of the present invention can be suitably used, owing to the characteristics, in applications such as paint, adhesive and sealant.

In particular, when water dispersible polyisocyanate (B) is at least one of polyisocyanate having a hydrophilic group and polyisocyanate not having a hydrophilic group but having a viscosity of 2000 mPa·s/25° C. or less, it becomes better in water dispersibility and the like, and the resin composition of the present invention becomes better as an aqueous composition.

When an NCO index is in a range of 1.2 to 1.6, the resin composition of the present invention becomes better in reactivity, drying characteristics, and the like. The NCO index is defined as the quotient of NCO-groups to the sum of NCO-reactive OH- and NH-groups.

Further, when aspartic acid ester having a secondary amino group (C) is a compound shown by the following general formula (1), the resin composition of the present invention becomes better in reactivity, drying characteristics, and the like.

BRIEF DESCRIPTION OF THE DRAWINGS

FIG. 1 shows the chemical structure of a compound of formula (1)

When a ratio of aspartic acid ester having a secondary amino group (C) to a total weight of hydrophilic polyol (A) and aspartic acid ester having a secondary amino group (C) is in a specific range, the resin composition of the present invention becomes better in reactivity, drying characteristics, and the like.

When the aqueous urethane resin composition of the present invention is a two component composition with a base resin consisting mainly of hydrophilic polyol (A) and containing aspartic acid ester having a secondary amino group (C), and a hardener consisting mainly of water dispersible polyisocyanate (B), it becomes better in reactivity, drying characteristics, mixing stability, handling, and the like.

MODE FOR CARRYING OUT THE INVENTION

Next, embodiments of the present invention will be described in detail.

As described before, the aqueous urethane resin composition of the present invention consists mainly of hydrophilic polyol (A) and contains water dispersible polyisocyanate (B) and aspartic acid ester having a secondary amino group (C). Additionally, in the present invention, the above-described "main component" is the one giving a significant influence on the characteristics of a composition, generally it means a component occupying the most in a composition (except water or solvent).

[Hydrophilic Polyol (A)]

As the above-described hydrophilic polyol (A), for example, various types of polyols such as acrylic, polyester and polyether can be used, having hydrophilicity by functional groups such as a carboxylic group and sulfonic group being at least partially neutralized, and there is used a polyol having a number average molecular weight (Mn) of 500 to 50000, preferably a number average molecular weight (Mn) of 1000 to 30000. Namely, the reason is that when the number average molecular weight is less than the above-described range, there is a tendency that drying characteristics are lowered, cross-linking density becomes too high and a hardened material becomes brittle, on the contrary, when it is more than the above-described range, there is a tendency that cross-linking density becomes low, and water resistance, resistance to solvents, and the like, are lowered. Additionally, the above-described number average molecular weight (Mn) can be obtained by gel permeation chromatography and the like.

The hydroxyl value of the above-described hydrophilic polyol (A) is preferably, in a range of 10 to 300 mgKOH/g, and more preferably 30 to 200 mgKOH/g, from the viewpoint of physical properties of a reactive composition. Namely, the reason is that when the hydroxyl value is less than the above-described range, water resistance and resistance to solvents tend to be inferior because urethane cross-linking is insufficient, on the contrary, when the hydroxyl value is more than the above-described range, flexibility tends to be lowered. Additionally, the above-described hydroxyl value is the mg number of potassium hydroxide equivalent to the hydroxyl groups contained in 1 g of a sample (solid content). It is obtained by the following formula after hydroxyl groups in a sample are acetylated using anhydrous acetic acid, and the acetic acid that was not used is titrated with a potassium hydroxide solution.

$$\text{Hydroxyl value [mgKOH/g]}=[((A-B)\times f\times 28.05)/S]+\text{acid value}$$

A: Amount (ml) of 0.5 mol/l potassium hydroxide ethanol solution used in a blank test
B: Amount (ml) of 0.5 mol/l potassium hydroxide ethanol solution used in titration
f: Factor
S: Sampling amount (g)

For the preparation method of the above-described hydrophilic polyol (A) (method for making polyol hydrophilic), various methods can be used. The above-described hydrophilic polyol (A) is preferably a polyol that was made hydrophilic with an anionic group. Namely, when the above-described hydrophilic polyol (A) is cationic, stability at mixing might deteriorate due to reaction with aspartic acid ester (C), but there is no such fear for anionic one. As a preferable example of methods for making polyol hydrophilic, for instance, there is a method that both of sulfonate and carboxylate, or either of the atomic groups is introduced to polyol, or the like. In this case, the acid value (based on both atomic groups of arbitral sulfonate and carboxylate not neutralized) is preferably 150 mgKOH/g or less, and more preferably 100 mgKOH/g or less.

For the above-described hydrophilic polyol (A), as described before, various types of polyols such as acrylic, polyester and polyether can be used. The polyol is produced by applying the well-known polymerization method using a mixture of unsaturated monomers selected from unsaturated monomer, hydroxyl group-containing unsaturated monomer and acid group-containing unsaturated monomer as a material, for example.

Examples of the unsaturated monomer include (meth)acrylate monomers such as methyl (meth)acrylate, ethyl (meth)acrylate, n-propyl (meth)acrylate, isopropyl (meth)acrylate n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth) acrylate, phenyl (meth)acrylate, methoxyethyl (meth)acrylate, ethoxyethyl (meth) acrylate, methoxypropyl (meth)acrylate and ethoxypropyl (meth)acrylate, styrene monomers such as styrene, methylstyrene, chlorostyrene and methoxystyrene, and the like.

Examples of the hydroxyl group-containing unsaturated monomer include hydroxyethyl (meth)acrylate, hydroxypropyl (meth) acrylate, hydroxybutyl (meth) acrylate, ε-caprolactone-modified hydroxyethyl methacrylate, polyethylene glycol mono(meth)acrylate, polypropylene glycol mono (meth)acrylate, and the like.

Examples of the acid group-containing unsaturated monomer include carboxylic acids such as (meth)acrylic acid, itaconic acid, crotonic acid and maleic acid, and the like.

Besides hydrophilic polyols obtained by polymerization of the various kinds of the above-described unsaturated monomers, modified polyols such as polyester-modified polyol, polyether-modified polyol, polycarbonate-modified polyol and silicone-modified polyol may be concomitantly used as a part of the material.

Thus obtained hydrophilic polyol (A) is provided ordinarily as a water containing dispersion, the ratio of the resin (solid content) is preferably in a range of 20 to 80% by weight, and more preferably 30 to 70% by weight. Additionally, viscosity is not particularly limited.

Examples of the commercially available product of the above-described hydrophilic polyol (A), include Bayhydrol A145 being an acrylic polyol containing anionic groups, manufactured by Bayer Material Science Ltd. [number average molecular weight (Mn) of 3900, resin content 45%, hydroxyl value 109 mgKOH/g (in terms of resin), acid value 10 mgKOH/g, viscosity 1000 mPa·s/23° C.], Bayhydrol A2546 being an acrylic polyol containing anionic groups, manufactured by Bayer Material Science Ltd. [number average molecular weight (Mn) of 13000, resin content 41%, hydroxyl value 56 mgKOH/g (as it is), viscosity 150 mPa·s/23° C.], Bayhydrol A2542 being an acrylic polyol containing anionic groups, manufactured by Bayer Material Science Ltd. [number average molecular weight (Mn) of 2700, resin content 50%, hydroxyl value 89 mgKOH/g (as it is), viscosity 2500 mPa·s/23° C.], Bayhydrol A2290 being an ester polyol containing anionic groups, manufactured by Bayer Material Science Ltd. [number average molecular weight (Mn) of 2000, resin content 45%, hydroxyl value 58 mgKOH/g (as it is), acid value 12 mgKOH/g, viscosity 1500 mPa·s/23° C.] and the like. These are used alone or in combinations of two or more thereof.

[Water Dispersible Polyisocyanate (B)]

Polyisocyanate used in the present invention is a polyisocyanate derived from monomeric isocyanate. The monomeric isocyanate may be any combination of aromatic, aromatic-substituted aliphatic, aliphatic, alicyclic one, and the like and examples thereof include an aromatic diisocyanate such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, diphenyldimethylmethane diisocyanate, dibenzyl diisocyanate, naphthylene diisocyanate, phenylene diisocyanate, xylylene diisocyanate and tetramethylxylylene diisocyanate; an aliphatic diisocyanate such as tetramethylene diisocyanate, hexamethylene diisocyanate, lysine diisocyanate, 2-methylpentane-1,5-diisocyanate, 3-methylpentane-1,5-diisocyanate, 2,2,4-trimethylhexamethylene-1,6-diisocyanate and 2,4,4-trimethylhexamethylene-1,6-diisocyanate; an alicyclic diisocyanate such as isophorone diisocyanate, cyclohexyl diisocyanate, hydrogenated xylylene diisocyanate, hydrogenated diphenylmethane diisocyanate and, and the like.

Polyisocyanate derived from monomeric isocyanate is a polyisocyanate having uretdione groups, isocyanurate groups, iminooxadiazinedione groups, urethane groups, allophanate groups and/or biuret groups derived by the well-known method, or a polyisocyanate mixture thereof, and it is preferable that the content of NCO group is 5% to 33%, and that the NCO functionality is 2.0 to 6.0.

Water dispersible polyisocyanate (B) used in the present invention is a water dispersible polyisocyanate chosen from the above-listed polyisocyanates. Therefore, regardless of falling into the above-listed polyisocyanate, one that is poor in water dispersibility is not used in the present invention. Regarding the above-described water dispersible polyisocyanate (B), in particular, a polyisocyanate having a hydrophilic group or a polyisocyanate not having a hydrophilic group but having a low viscosity (viscosity of 2000 mPa·s/25° C. or less) can be advantageously used as a water dispersible polyisocyanate. Additionally, it is possible to use both of them as they are mixed.

The polyisocyanate having a hydrophilic group can be prepared by various methods. For example, there is a method of introducing a functional group that is non-ionic and incorporates hydrophilicity into polyisocyanate, a typical one is introduction of hydrophilic ethylene oxide groups.

A compound including a hydrophilic ethylene oxide unit includes at least one (preferably one) isocyanate-reactive group, and it is used in such a sufficient amount that the content of hydrophilic ethylene oxide units is 40% by weight or less, preferably 5 to 40% by weight, and more preferably 10 to 35% by weight relative to the weight of polyisocyanate.

As another preparation method of polyisocyanate having a hydrophilic group, for example, there is a method of introducing a compound including an ionic group or an ionizable group, and this compound is preferably anionic. If the above-described compound is cationic, polyisocyanate to which the compound is introduced becomes cationic to react with aspartic acid ester (C), and stability at mixing might deteriorate. As a preferable anionic group that the above-described compound has, a carboxylate group or a sulfonate group is specifically listed. For the above-described compound, one including one or more isocyanate-reactive groups is used, and it is used in the amount of 120 mg equivalent weight per 100 g of polyisocyanate, preferably 5 to 80 mg equivalent weight, more preferably 10 to 60 mg equivalent weight, and most preferably 15 to 50 mg equivalent weight Regarding the compounding ratio of water dispersible polyisocyanate (B) obtained in this way to hydrophilic polyol (A), it is preferable that compounding is conducted for the NCO index [equivalent ratio of NCO group in isocyanate to hydroxyl group in polyol and secondary amino group in aspartic acid ester (NCO group/(OH+NH group))] so as to be in a range of 1.2 to 1.6, from the viewpoints of the reactivity, drying characteristics, physical properties of reactive resin and the like. Additionally, the reason is that when the NCO index is smaller than the above-described range, there is a tendency that water resistance and resistance to solvents in physical properties of resin are lowered, on the contrary, when the NCO index is larger than the above-described range, there is a tendency that reactivity and drying characteristics are lowered and extension of resin composition is lowered.

[Aspartic Acid Ester Having a Secondary Amino Group (C)]

As the aspartic acid ester having a secondary amino group (C) used along with the above-described hydrophilic polyol (A) and water dispersible polyisocyanate (B), a compound shown in the following formula (1) is preferable from the viewpoints of reactivity, drying characteristics, mixing stability, usable time, and the like in the resin composition of the present invention.

[C. 2]

In the above-described formula (1), X is preferably a group obtained by removing m amino groups from an aliphatic or alicyclic polyamine. In the above-described formula (1), $R^1$, $R^2$ are preferably an alkyl group with the carbon atom number of 1 to 9, more preferably a methyl, ethyl or butyl group. Additionally, $R^1$, $R^2$ may form an alicyclic or heterocyclic ring together with a β carbon atom, and form an organic group inactive to hydrogen or an isocyanate group at a temperature of 100° C. or less. In the above-described formula (1), m is an integer of 2 or more, preferably an integer of 2 to 4, and more preferably 2.

These aspartic acid esters can be produced in such a manner that arbitrarily-substituted maleate or fumarate is reacted with polyamine.

As a specific example of arbitrarily-substituted maleate or fumarate that is suitably used for production of the above-described aspartic acid ester, there are listed dimethyl, diethyl and dibutyl (for example, di-n-butyl) ester of maleic acid and fumaric acid, maleate or fumarate substituted with a methyl group at 2- and/or 3-position, and the like. Above all, diethyl maleate is preferable.

Examples of an amine suitable for producing aspartic acid ester include one shown in the following formula (2).

Description [C. 3]

$$X-(NH_2)_m \quad (2)$$

[In the formula (2), X and m are follow the definition of the formula (1).]
[C. 3]

Examples of the above-described amine include ones in which an amino group is bonded to a carbon atom of an aliphatic hydrocarbon group, a carbon atom of an alicyclic hydrocarbon group and a carbon atom of an aromatic hydrocarbon group.

Preferable examples of the above-described amine include 1-amino-3-aminomethyl-3,5,5-trimethyl-cyclohexane (isophorone diamine, that is, IPDA), bis-(4-amino-cyclo-hexyl)-methane, bis-(4-amino-3-methylcyclohexyl)-methane, 1,6-diamino-hexane, 2-methylpentamethylenediamine, ethylenediamine, triamino-nonane, and the like. More preferable amines are bis-(4-aminocyclo-hexyl)-methane and 2-methylpentamethylene diamine.

An amine value of the above-described aspartic acid ester (C) is preferably, from the viewpoint of reaction speed, in a range of 100 to 300 mgKOH/g, and more preferably 180 to 250 mgKOH/g. Namely, the reason is that when the amine value is less than the above-described range, the aim of the present invention cannot be achieved because reaction speed is slow, on the contrary, when the amine value is more than the above-described range, handling tends to become difficult because reaction speed is too fast. Additionally, the amine value is a numerical value expressing an amine concentration that amine being basic contained in a sample of 1 g is measured with HCl (0.5 mol/L) by a titration method, and it is obtained by the following formula.

$$\text{Amine value [mgKOH/g]}=(A \times f \times 28.05)/S$$

A: Titration amount (ml) of HCl required for measurement
f: Factor of HCl
S: Sampling amount (g)

Specific examples of the above-described aspartic acid ester (C) include an aspartic acid ester obtained by a reaction of diethyl maleate with bis-(4-aminocyclohexyl)-methane or 2-methylpentamethylenediamine, or the like. As the commercially available products, Desmophen NH1420 (manufactured by Bayer Material Science Ltd.), Desmophen NH1220 (manufactured by Bayer Material Science Ltd.) and the like are listed. These are used alone or in combinations of two or more thereof.

It is preferable that the ratio of aspartic acid ester having a secondary amino group (C) to the total weight of hydrophilic polyol (A) and aspartic acid ester having a secondary amino group (C) is in a range of 15 to 50% by weight, from the viewpoints of reactivity, drying characteristics, and the like, in the resin composition of the present invention. Additionally, the above-described ratio shows a solid content percentage and does not include solvents. The reason is that when the ratio is less than 15% by weight, reactivity and drying characteristics are not sufficient, on the contrary, when the ratio is more than 50% by weight, a ratio of water dispersible polyisocyanate to be required becomes high, material costs, and the like might increase, and mixing stability and usable time might tend to be disadvantageous.

Generally, in addition to aspartic acid ester having a secondary amino group (C), a compound having a primary amino group (primary amine) is known as a material which may be expected to improve reactivity and drying characteristics, but in the present invention, a compound having a primary amino group is not used, because there is a problem on mixing stability with a base resin (gelation). Known examples of the compound having a primary amino group include IPDA (isophorone diamine:alicyclic), DETDA (diethyltoluenediamine:aromatic), Jeffamine T-403 (manufactured by Huntsman Corporation, trifunctional polyetheramine, molecular weight of about 440), and the like.

In the aqueous urethane resin composition of the present invention, there may be suitably compounded a dissolving agent, additive, filler, plasticizer, pigment, carbon black, silica sol, leveling agent, moisturizing agent, antifoam, foam-controlling agent, dispersing agent, stabilizer, modifier, catalyst and the like, as necessary, in addition to the above-described components (A) to (C). Further in detail, as a filler, there can be used an organic polymer bead being a hollow bead, an inorganic bead such as glass bead, silica bead, cilas bead, alumina bead, zirconium bead, aluminosilicate bead, and as a heat shielding pigment, there can be used a composite pigment that an azo organic pigment and a metal compound such as rutile type titanium oxide are compounded, and the like.

For the aqueous urethane resin composition of the present invention, water is mainly used as its solvent.

The aqueous urethane resin composition of the present invention can be prepared by mixing the above-described components (A) through (C) and optionally additives and the like. As for means of the mixing, for example, there can be listed a mixing treatment using various kinds of mixing apparatuses such as vacuum homo mixer, dispar, propeller mixer, kneader and high-pressure homogenizer, in addition to mixing and stirring by hand.

Additionally, in the case that the aqueous urethane resin composition of the present invention is used in an application like paint, adhesive, sealant, and the like, where storage stability before use, and a good proceeding of hardening reaction in use are required, it is preferable that the aqueous urethane resin composition of the present invention is divided into two or more agents, and that at the point of use, these plural agents are mixed by the above-described means to proceed a hardening reaction, from the viewpoints of storage stability before use and hardening and drying characteristics in use.

In this way, in the case of dividing the aqueous urethane resin composition of the present invention into a plurality of agents, it is particularly preferable that a two component composition is composed first of a base resin consisting mainly of hydrophilic polyol (A) and containing aspartic acid ester having a secondary amino group (C), and as second component a hardener consisting mainly of water dispersible polyisocyanate (B), from viewpoints of improving drying characteristics, mixing stability, handling, and the like. Additionally, according to need, a part of hydrophilic polyol (A) may be compounded in a hardener side to be a prepolymer, with which the above-described two component composition may be prepared.

Examples of a coating method include spray, brush coating, roller, doctor blade, injection from a nozzle, and the like. It is also possible to use a machine, and the like where mixing of a base resin and a hardener is incorporated with coating.

In the case of preparing a two component composition and spray coating, from the points of handling, and the like, viscosity at mixing of the base resin and hardener is preferably in a range of 10 to 120 seconds in cup viscosity (Iwata Cup), particularly preferably in a range of 15 to 60 seconds. Additionally, the viscosity is adjusted by the use of additional amount of water being a solvent for the base resin.

Since the obtained aqueous urethane resin composition of the present invention is aqueous, it is applied to usages considering the requirement of VOC reduction and working conditions. The aqueous urethane resin composition of the present invention can be applied to all fields where conventional urethane resins have been used, in particular, since reactivity and drying characteristics are excellent. Even when thick films are formed by applying at low temperatures, it can be used suitably in fields such as paint, adhesive and sealant.

EXAMPLE

Next, Examples are explained together with Comparative Examples. However, the present invention is not limited thereto.

In advance to Examples and Comparative Examples, each material shown below was prepared first.

[Hydrophilic Polyol (i) (A Component)]
Bayhydrol A2546: manufactured by Bayer Material Science Ltd. [acrylic polyol containing an anion group, number average molecular weight (Mn) of 13000, resin content 41%, hydroxyl value 56 mgKOH/g (as it is), viscosity 150 mPa·s/23° C.]

[Hydrophilic Polyol (ii) (A Component)]
Bayhydrol A2290: manufactured by Bayer Material Science Ltd. [ester polyol containing an anion group, number average molecular weight (Mn) of 2000, resin content 45%, hydroxyl value 58 mgKOH/g (as it is), viscosity 1500 mPa·s/23° C.]

[Aspartic Acid Ester (i) (C Component)]
344 g of maleic acid diethylester (2.0 moles) were added dropwise with stirring to 116 g 2-methyl-1,5-pentane diamine (1.0 mole) in a three necked flask equipped with stirrer, thermometer and addition funnel. The addition was done at a rate such that the exotherm did not exceed 50° C. Upon complete addition of the maleic acid diethylester the content of the reaction flask was maintained at 50° C. for a period of 12 hours. The resulting product was a clear, nearly colorless liquid having a viscosity of about 100 mPas@25° C. and an amine value about 246 mgKOH/g.

[Aspartic Acid Ester (ii) (C Component)]
344 g of maleic acid diethylester (2.0 moles) were added dropwise with stirring to 210 g 4,4'-diamino-dicyclohexyl-methane (1.0 mole) in a three necked flask equipped with stirrer, thermometer and addition funnel. The addition was done at a rate such that the exotherm did not exceed 50° C. Upon complete addition of the maleic acid diethylester the content of the reaction flask was maintained at 50° C. for a period of 12 hours. The resulting product was a clear, colorless liquid having a viscosity of about 1400 mPas@25° C. and an amine value about 200 mgKOH/g

[Water Dispersible Polyisocyanate (i) (B Component)]
Bayhydur XP2547: manufactured by Bayer Material Science Ltd. [HDI (hexamethylene diisocyanate) polyisocyanate containing an anionic hydrophilic group, content of NCO group 22.5%, viscosity 650 mPa·s/23° C.]

[Water Dispersible Polyisocyanate (ii) (B Component)]
Bayhydur 3100: manufactured by Bayer Material Science Ltd. [HDI isocyanurate polyisocyanate containing a non-ionic hydrophilic group, content of NCO group 17.5%, viscosity 2800 mPa·s/23° C.]

[Water Dispersible Polyisocyanate (iii) (B Component)]
Desmodur N 3900: manufactured by Bayer Material Science Ltd. [low-viscosity HDI polyisocyanate, content of NCO group 23.5%, viscosity 700 mPa·s/23° C.]

[Primary Amine (i)]
Isophorone diamine (IPDA)

[Primary Amine (ii)]
Diethyltoluenediamine (DETDA)

[Primary Amine (iii)]
Trifunctional polyetheramine (Jeffamine T-403, manufactured by Huntsman Corporation)

(Modifier)
Poligen WE 1 (Manufactured by BASF Corporation)

(Moisturizing Agent)
BYK187 (manufactured by BYK Corporation)

(Antifoam)
BYK024 (manufactured by BYK Corporation)

(Leveling Agent)
BYK380 (manufactured by BYK Corporation)

(Viscosity Modifier)
Acrysol RM-5000 (manufactured by Rohm&Haas Corporation)

Example 1

There were mixed 89.8 parts by weight of hydrophilic polyol (i), 6.5 parts by weight of aspartic acid ester (i), 4.5 parts by weight of modifier, 3.6 parts by weight of additives (moisturizing agent, antifoam, leveling agent, viscosity modifier) and 31.8 parts by weight of water, and this was used as a base resin. 25.9 parts by weight of water dispersible polyisocyanate (i) was used as a hardener. Then, the above-prepared base resin and hardener were mixed to prepare a resin composition. In this case, it was adjusted with water so that a solid content in mixing the base resin and hardener was 40 to 48% by weight, and a cup viscosity in mixing the base resin and hardener was 30 to 35 seconds. The ratio of hydrophilic polyollaspartic acid ester (in terms of resin) in the resin composition, and the NCO index of the resin composition are as shown in Table 1 described below.

Examples 2 to 9, Comparative Examples 1 to 7

Resin compositions were prepared in accordance with Example 1 with the blending quantity of each component changed as shown in Table 1 to Table 3 described below. The ratio of hydrophilic polyol/aspartic acid ester (in terms of resin) in each resin composition, and the NCO index of each resin composition are as shown in Table 1 to Table 3 described below.

Using the thus obtained resin compositions of Examples and Comparative Examples, evaluations of each characteristic were conducted in accordance with the following criteria. The results were also shown in Table 1 to Table 3 described below.

[Drying Characteristics]
The resin composition was applied on a glass plate using a doctor blade to form the coating into a thick film (about 60 μm in a dried state), then using a dryer (Platinous Lucifer PL-2K, manufactured by ESPEC Corporation), evaluations on drying characteristics of the above-described coating were conducted under normal temperature environment (21.5° C., humidity 46.5%, wind speed of about 0.5 m/s) or under low-temperature environment (5° C., humidity 50%, wind speed of about 0.5 m/s). On this occasion, time (minutes) required to dry the above-described coating to half-hardening was measured in accordance with JIS K 5600-1-1. The drying to half-hardening indicates a state where no scar occurs on a coated surface when the center of the coated surface is rubbed with a fingertip gently and lightly. This state means that water flies to some extent and reaction proceeds to some extent, as a result, fine dusts, and the like from the outside do not attach thereto, and scar hardly occurs within the usual range, thus, it becomes an important index in actual operations. Under normal temperature environment, the evaluation was ○ when the hardening time was less than 100 minutes, and x when the hardening time was 100 minutes or more, and under low-temperature environment, the evaluation was ○ when the hardening time was less than 200 minutes, and x when the hardening time was 200 minutes or more.

[Coating Appearance]

The resin composition was applied on a glass plate and completely hardened, and then luster (gloss) of the surface of the coating was measured at a measuring angle of 60° using a gloss meter (manufactured by BYK Corporation, micro-haze plus).

[Coating Hardness]

The resin composition was applied on a glass plate and completely hardened, and then hardness (seconds) of the surface of the coating was measured using a pendulum hardness tester (manufactured by BYK Corporation). The evaluation was ○ in the case of 170 or more, and x in the case of less than 170.

[Resistance to Chemicals (Spot Test)]

The resin composition was applied on a glass plate and completely hardened, and then resistance to chemicals of the coating was tested in accordance with JIS A 5705. Namely, under an environment of 20° C., after a liquid drop of 30% aqueous hydrochloric acid (HCl) or 30% aqueous sodium hydroxide (NaOH) was brought into contact with the coating for 48 hours, the liquid drop was wiped out to observe the coating surface state with a naked eye. The evaluation was ○ when almost no trace of liquid drop remained, and x when the trace of liquid drop remained.

[Resistance to Solvents (Spot Test)]

The resin composition was applied on a glass plate and completely hardened, and then under an environment of 20° C., a liquid drop of solvent (water or toluene) was brought into contact with the coating for one minute, and the liquid drop was wiped out to observe the coating surface state with a naked eye. The evaluation was ○ when almost no trace of liquid drop remained, and x when the trace of liquid drop remained.

[Mixing Stability]

Hydrophilic polyol (A) and aspartic acid ester (C) were blended by a predetermined mixing ratio in terms of resin, and then allowed to stand still in a glass container at room temperature, the liquid states were observed with a naked eye from right after the mixing to 3 days thereafter. The evaluation was ○ in the case of a state being homogenized and not separated, and x in the case of a separating state or gelling state. Additionally, as for Comparative Examples 3 and 4, aspartic acid ester and water were blended in a ratio of 45:55 by weight and evaluated. As for Comparative Examples 5, 6, and 7, hydrophilic polyol and primary amine were blended in a ratio of 98:2 by weight and evaluated.

(Usable Time)

The predetermined amounts of base resin and hardener were sampled, and mixed using a homogenizer, allowed to stand still in a polymer cup for 10 minutes, and then the polymer cup was tilted to observe fluidity of the mixed liquid with a naked eye. The evaluation was ○ when fluidity was present, and x when fluidity was absent.

TABLE 1

|  |  | <<Parts by weight>> Example | | | | |
| --- | --- | --- | --- | --- | --- | --- |
|  |  | 1 | 2 | 3 | 4 | 5 |
| Hydrophilic polyol | i | 89.8 | 89.8 | 89.8 | 89.8 | 89.8 |
|  | ii | — | — | — | — | — |
| Aspartic acid ester | i | 6.5 | 6.5 | 12.3 | 36.8 | — |
|  | ii | — | — | — | — | 15.8 |
| Water |  | 31.8 | 33.8 | 42.4 | 92.0 | 56.6 |
| Modifier |  | 4.5 | 5.0 | 5.8 | 9.3 | 6.1 |
| Moisturizing agent |  | 0.8 | 0.9 | 1.0 | 1.6 | 1.1 |
| Antifoam |  | 0.5 | 0.6 | 0.7 | 1.0 | 0.7 |
| Leveling agent |  | 0.9 | 1.0 | 1.2 | 2.6 | 1.2 |
| Viscosity modifier |  | 1.4 | 1.4 | 1.8 | 2.8 | 1.8 |
| Water dispersible | i | 25.9 | 32.3 | 39.2 | 68.4 | 40.1 |
| polyisocyanate | ii | — | — | — | — | — |
|  | iii | — | — | — | — | — |
| Ratio of hydrophilic polyol/aspartic acid ester (in terms of resin) |  | 85/15 | 85/15 | 75/25 | 50/50 | 70/30 |
| NCO index |  | 1.2 | 1.5 | 1.5 | 1.5 | 1.5 |
| Drying characteristics | Normal temperature Minutes | 75 | 90 | 70 | 50 | 21 |
|  | Evaluation | ○ | ○ | ○ | ○ | ○ |
|  | Low temperature Minutes | 100 | 175 | 90 | 60 | 19 |
|  | Evaluation | ○ | ○ | ○ | ○ | ○ |
| Coating appearance | Measurement | 11 | 10 | 12 | 20 | 12 |
| Coating hardness | Measurement | 184 | 186 | 188 | 190 | 187 |
|  | Evaluation | ○ | ○ | ○ | ○ | ○ |
| Resistance to chemicals | HCl | ○ | ○ | ○ | ○ | ○ |
|  | NaOH | ○ | ○ | ○ | ○ | ○ |
| Resistance to solvents | Toluene | ○ | ○ | ○ | ○ | ○ |
|  | Water | ○ | ○ | ○ | ○ | ○ |
| Mixing stability |  | ○ | ○ | ○ | ○ | ○ |
| Usable time |  | ○ | ○ | ○ | ○ | ○ |

TABLE 2

| | | | <<Parts by weight>> Example | | | |
|---|---|---|---|---|---|---|
| | | | 6 | 7 | 8 | 9 |
| Hydrophilic polyol | i | | 89.8 | — | 89.8 | 89.8 |
| | ii | | — | 81.8 | — | — |
| Aspartic acid ester | i | | — | — | 6.6 | 6.5 |
| | ii | | 36.8 | 6.5 | — | — |
| Water | | | 91.5 | 33.7 | 34.1 | 33.8 |
| Modifier | | | 8.8 | 4.9 | 5.7 | 4.9 |
| Moisturizing agent | | | 1.5 | 0.9 | 1.0 | 0.9 |
| Antifoam | | | 1.0 | 0.4 | 0.4 | 0.4 |
| Leveling agent | | | 1.8 | 1.0 | 1.2 | 1.0 |
| Viscosity modifier | | | 2.6 | 1.4 | 1.6 | 1.4 |
| Water dispersible polyisocyanate | i | | 60.7 | 31.0 | — | — |
| | ii | | — | — | 42.7 | — |
| | iii | | — | — | — | 31.6 |
| Ratio of hydrophilic polyol/aspartic acid ester (in terms of resin) | | | 50/50 | 85/15 | 85/15 | 85/15 |
| NCO index | | | 1.5 | 1.5 | 1.5 | 1.5 |
| Drying characteristics | Normal temperature | Minutes | 21 | 90 | 90 | 90 |
| | | Evaluation | ○ | ○ | ○ | ○ |
| | Low temperature | Minutes | 25 | 135 | 175 | 150 |
| | | Evaluation | ○ | ○ | ○ | ○ |
| Coating appearance | | Measurement | 35 | 30 | 12 | 10 |
| Coating hardness | | Measurement | 183 | 170 | 181 | 190 |
| | | Evaluation | ○ | ○ | ○ | ○ |
| Resistance to chemicals | HCl | | ○ | ○ | ○ | ○ |
| | NaOH | | ○ | ○ | ○ | ○ |
| Resistance to solvents | Toluene | | ○ | ○ | ○ | ○ |
| | Water | | ○ | ○ | ○ | ○ |
| Mixing stability | | | ○ | ○ | ○ | ○ |
| Usable time | | | ○ | ○ | ○ | ○ |

TABLE 3

| | | | <<Parts by weight>> Comparative Example | | | | | | |
|---|---|---|---|---|---|---|---|---|---|
| | | | 1 | 2 | 3 | 4 | 5 | 6 | 7 |
| Hydrophilic polyol | i | | 89.8 | — | — | — | 98 | 98 | 98 |
| | ii | | — | 89.0 | — | — | — | — | — |
| Aspartic acid ester | i | | — | — | 55 | — | — | — | — |
| | ii | | — | — | — | 55 | — | — | — |
| Primary amines | i | | — | — | — | — | 2 | — | — |
| | ii | | — | — | — | — | — | 2 | — |
| | iii | | — | — | — | — | — | — | 2 |
| Water | | | 30.4 | 41.8 | 45 | 45 | — | — | — |
| Modifier | | | 4.0 | 4.2 | — | — | — | — | — |
| Moisturizing agent | | | 0.7 | 0.7 | — | — | — | — | — |
| Antifoam | | | 0.4 | 0.3 | — | — | — | — | — |
| Leveling agent | | | 0.8 | 0.9 | — | — | — | — | — |
| Viscosity modifier | | | 1.2 | 1.2 | — | — | — | — | — |
| Water dispersible polyisocyanate i | | | 24.6 | 24.4 | 65.7 | 54.1 | — | — | — |
| Ratio of hydrophilic polyol/aspartic acid ester (in terms of resin) | | | 100/0 | 100/0 | 0/100 | 0/100 | 100/0 | 100/0 | 100/0 |
| NCO index | | | 1.5 | 1.5 | 1.5 | 1.5 | | | |
| Drying characteristics | Normal temperature | Minutes | 110 | 165 | — | — | — | — | — |
| | | Evaluation | x | x | — | — | — | — | — |
| | Low temperature | Minutes | 220 | 300 | — | — | — | — | — |
| | | Evaluation | x | x | — | — | — | — | — |
| Coating appearance | | Measurement | 3 | 5 | — | — | — | — | — |
| Coating hardness | | Measurement | 185 | 171 | — | — | — | — | — |
| | | Evaluation | ○ | ○ | — | — | — | — | — |
| Resistance to chemicals | HCl | | ○ | ○ | — | — | — | — | — |
| | NaOH | | ○ | ○ | — | — | — | — | — |
| Resistance to solvents | Toluene | | ○ | ○ | — | — | — | — | — |
| | Water | | ○ | ○ | — | — | — | — | — |
| Mixing stability | | | ○ | ○ | x | x | x | x | x |
| Usable time | | | ○ | ○ | x | x | — | — | — |

From the results of the above-described tables, every resin composition of Examples is excellent in reactivity and drying characteristics even when applied to form a thick film under low-temperature environment, high in coating hardness, excellent in resistance to chemicals and resistance to solvents. Every resin composition of Examples is good in mixing stability of base resin, and has a merit that usable time is relatively long.

In contrast, the resin compositions of Comparative Examples 1 and 2 not including aspartic acid ester had a poor result in reactivity and drying characteristics when applied to form a thick film under low-temperature environment. The resin compositions of Comparative Examples 3 and 4 being a polyurea resin composition were bad in mixing stability, and liquid phase separation occurred in several minutes after mixing. They were short in usable time and difficult in handling, and it was impossible to apply them. As for Comparative Examples 5, 6, and 7 using a primary amine, mixing stability was bad, and gelation occurred right after mixing.

INDUSTRIAL APPLICABILITY

Since the aqueous urethane resin composition of the present invention is aqueous, it is adaptable to usage taking the requirement of VOC reduction and working conditions into consideration. The aqueous urethane resin composition of the present invention can be applied to all fields where conventional urethane resin compositions have been used. In particular, since reactivity and drying characteristics are excellent even when thick film is formed by applying under low temperatures, it can be suitably used in fields such as paint, adhesive and sealant.

The invention claimed is:

1. An aqueous resin composition comprising as separate components:
(A) a hydrophilic polyol,
(B) a water dispersible polyisocyanate, and
(C) an aspartic acid ester having a secondary amino group of formula (1)

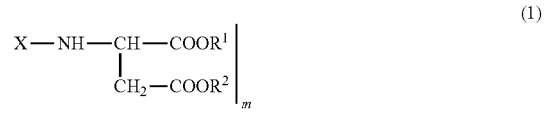

wherein
m is an integer of 2 or more,
X is an m-valent organic group inactive to an isocyanate group at a temperature of 100° C. or less,
$R^1$ and $R^2$ are identical or different from each other and are organic groups inactive to isocyanate,
wherein the ratio of aspartic acid ester having a secondary amino group (C) to the total weight of hydrophilic polyol (A) and aspartic acid ester having a secondary amino group (C) is in a range of 15 to 50% by weight.

2. The aqueous resin composition of claim 1, wherein the water dispersible polyisocyanate (B) is at least one polyisocyanate having a hydrophilic group or a polyisocyanate not having a hydrophilic group but having a viscosity of 2000 mPa·s/25° C. or less.

3. The aqueous resin composition of claim 1, wherein an NCO index is in a range of 1.2 to 1.6.

4. The aqueous resin composition of claim 1, wherein the hydrophilic polyol (A) is a polyol containing an anionic group.

5. The aqueous resin composition of claim 1, wherein the aqueous urethane resin composition is a two component composition with a base resin comprising the hydrophilic polyol (A) and containing aspartic acid ester having a secondary amino group (C), and a hardener comprising the water dispersible polyisocyanate (B).

6. A paint, an adhesive or a sealant comprising the aqueous urethane resin composition of claim 1.

* * * * *